S. N. CAMPBELL.
Churn.
No. 25,804.
Patented Oct. 18, 1859.
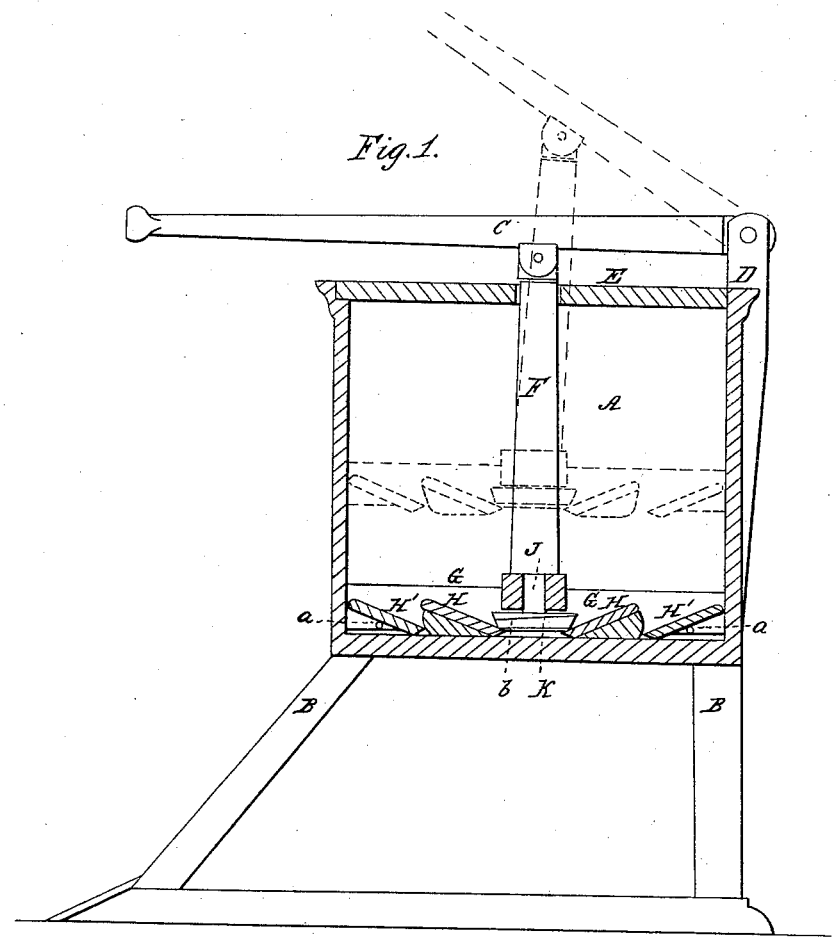
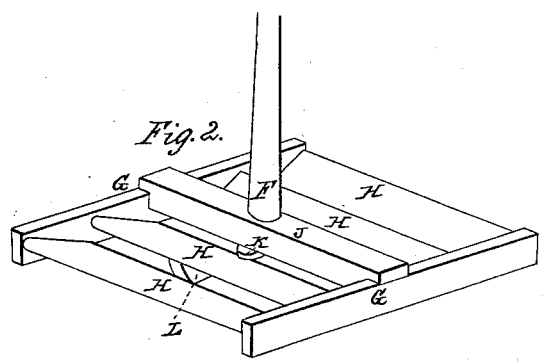
Witnesses:
Inventor:
S. N. Campbell

UNITED STATES PATENT OFFICE.

S. N. CAMPBELL, OF ELGIN, ILLINOIS.

CHURN.

Specification of Letters Patent No. 25,804, dated October 18, 1859.

*To all whom it may concern:*

Be it known that I, S. N. CAMPBELL, of Elgin, in the county of Kane and State of Illinois, have invented a new and useful Improvement in Churns; and I do hereby declare that the following is a full, clear, and exact description of the same, reference being had to the accompanying drawings and to the letters of reference marked thereon.

Figure 1, represents a vertical section of the churn dasher, and a section through the churn box. The dasher is here shown in two positions. Fig. 2, is a perspective view of the dasher detached from the box.

A, represents a quadrilateral box supported upon a suitable frame B.

C, is a lever one end of which is pivoted to the upper part of a post D, fixed to the back of the box. This box forms the body of the churn and is covered by lid E.

To the lever C, is pivoted the dasher rod F, and to the lower end of this rod is fixed the dasher G, which corresponds to the sides of the box A, and fits the same closely yet free to move up and down with the dasher rod. This dasher is constructed with movable slats H, H, which, when open, rest upon stop pins $a$, and serve the office of deflectors, and as the dasher is drawn up the cream is thrown below the slats and to the sides of the churn and as the dasher is pressed down the cream will be forced up and toward the center of the churn, and against a cross piece J, secured to the center of the dasher.

On the lowermost end of the rod F, under the cross piece J, is fixed a button K, which can be revolved with the rod. The object of this button is to regulate the distance between the slats H, through which the cream passes according to its consistency, and this is effected by having two inclined surfaces $b$, on either side of said button which project from its sides and incline up in opposite directions, so that by turning this button in one direction the slats are kept open, as in Fig. 1, and by turning it half around, the slats close when the dasher is pushed down upon the cream.

The slats H', are operated so as to open and close in the same manner, by pieces L, L, fixed to these slats and acting upon their edges.

The efficiency of the above described invention for churning butter renders it a valuable acquisition both for making and working butter which is effected with ease and speediness.

Having thus described my invention, what I claim and desire to secure by Letters Patent, is—

The arrangement and combination of the button K, dasher rod F, movable slats H, H', pieces L, and bar J, as and for the purposes herein set forth and described.

S. N. CAMPBELL.

Witnesses:
O. DAVIDSON,
J. DAVIDSON.